United States Patent
Jeon et al.

(10) Patent No.: US 12,415,877 B2
(45) Date of Patent: Sep. 16, 2025

(54) ACRYLIC COPOLYMER COAGULANT AND METHOD OF PREPARING GRAFT COPOLYMER USING THE SAME

(71) Applicant: LG CHEM, LTD., Seoul (KR)

(72) Inventors: Hee Jung Jeon, Daejeon (KR); Geon Soo Kim, Daejeon (KR); Moon Ja Hwang, Daejeon (KR); Hyung Joon Kim, Daejeon (KR); Chang Hoe Kim, Daejeon (KR); Min Su Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 791 days.

(21) Appl. No.: 17/436,025

(22) PCT Filed: Jul. 15, 2020

(86) PCT No.: PCT/KR2020/009324
§ 371 (c)(1),
(2) Date: Sep. 2, 2021

(87) PCT Pub. No.: WO2021/015485
PCT Pub. Date: Jan. 28, 2021

(65) Prior Publication Data
US 2022/0177621 A1    Jun. 9, 2022

(30) Foreign Application Priority Data

Jul. 24, 2019  (KR) .................. 10-2019-0089774

(51) Int. Cl.
*C08F 220/06* (2006.01)
*C08C 1/15* (2006.01)
*C08L 51/04* (2006.01)

(52) U.S. Cl.
CPC .............. *C08F 220/06* (2013.01); *C08C 1/15* (2013.01); *C08L 51/04* (2013.01)

(58) Field of Classification Search
CPC .............. C08F 220/06; C08F 220/14; C08F 220/1802; C08F 6/22; C08F 279/04; C08F 6/18; C08C 1/15; C08C 1/065; C08L 51/04; C08L 2207/04
See application file for complete search history.

(56) References Cited

U.S. PATENT DOCUMENTS

| | | | | |
|---|---|---|---|---|
| 4,487,890 A | * | 12/1984 | Kishida | C08F 279/02 525/193 |
| 4,694,032 A | * | 9/1987 | Kakimoto | C08L 51/04 524/217 |
| 5,204,406 A | | 4/1993 | Fujii et al. | |
| 5,708,082 A | | 1/1998 | Huang | |
| 2010/0048816 A1 | | 2/2010 | Ryu et al. | |
| 2011/0077355 A1 | | 3/2011 | Shikisai et al. | |
| 2016/0304652 A1 | | 10/2016 | Niessner et al. | |

FOREIGN PATENT DOCUMENTS

| | | | |
|---|---|---|---|
| CN | 109517286 A | | 3/2019 |
| EP | 0077038 A2 | | 4/1983 |
| JP | H0859704 A | * | 3/1996 |
| JP | H10158460 A | | 6/1998 |
| JP | 2000-007874 A | | 1/2000 |
| JP | 3358885 B2 | | 12/2002 |
| JP | 2003105161 A | | 4/2003 |
| JP | 3648861 B2 | | 5/2005 |
| JP | 2006143924 A | | 6/2006 |
| KR | 950026896 A | | 10/1995 |
| KR | 1998-0057234 A | | 9/1998 |
| KR | 20100044215 A | | 4/2010 |
| KR | 101101092 B1 | | 12/2011 |
| KR | 20180047749 A | | 5/2018 |
| WO | 2015-086164 A1 | | 6/2015 |

OTHER PUBLICATIONS

English Translation of JPH0859704A (Year: 1996).*
Supplementary European Search Report for related EP application No. 20843694.9, mailed Sep. 6, 2022.

* cited by examiner

*Primary Examiner* — Mark Eashoo
*Assistant Examiner* — Cullen L G Davidson

(57) ABSTRACT

The present invention provides an acrylic copolymer coagulant which is a copolymer of a monomer mixture comprising a carboxylic acid-based monomer and an acrylic monomer, and a method of preparing a graft copolymer using the same. According to the present invention, a graft copolymer excellent in impact strength, surface gloss characteristics, and processability can be prepared.

6 Claims, No Drawings

ACRYLIC COPOLYMER COAGULANT AND METHOD OF PREPARING GRAFT COPOLYMER USING THE SAME

CROSS-REFERENCE TO RELATED APPLICATION

This application is a National Phase of International Application No. PCT/KR2020/009324, which claims priority to and the benefit of Korean Patent Application No. 10-2019-0089774, filed on Jul. 24, 2019, the disclosures of which are incorporated herein by reference in their entirety.

TECHNICAL FIELD

The present invention relates to an acrylic copolymer coagulant and a method of preparing a graft copolymer using the same, and particularly, to an acrylic copolymer coagulant whose composition and average particle diameter have been adjusted within specific ranges and a method of preparing a graft copolymer using the same.

BACKGROUND ART

Acrylonitrile-butadiene-styrene copolymers (hereinafter, referred to as "ABS copolymers") are formed by graft copolymerization of a butadiene rubber polymer with styrene and acrylonitrile.

ABS copolymers exhibit excellent physical properties such as high impact resistance, high chemical resistance, high thermal stability, high colorability, high fatigue resistance, high rigidity, high processability, and the like compared to existing high-impact polystyrene (HIPS), and, among them, especially, processability is excellent. Due to these characteristics, ABS copolymers can be used in interior and exterior materials for automobiles, office equipment, parts of various electric and electronic products, toys, or the like.

Meanwhile, in order to form ABS copolymers having excellent impact resistance, the particle diameter of the butadiene rubber polymer needs to be appropriately adjusted. Typically, when the average particle diameter thereof is in a range of 250 nm to 400 nm, excellent impact resistance may be realized without degradation of surface gloss characteristics. However, when a butadiene rubber polymer having the above-described average particle diameter is prepared by emulsion polymerization, a polymerization time is excessively prolonged, leading to degraded productivity. Accordingly, a method of preparing a butadiene rubber polymer having an average particle diameter of about 100 nm and then enlarging the butadiene rubber polymer with a coagulant has been proposed. However, when acetic acid is used as the coagulant in the enlargement, an excessive amount of aggregates is generated, and when the concentration of a butadiene rubber polymer latex is lowered to reduce the generation of aggregates, productivity is degraded. In order to solve these problems, a method of using an acrylic copolymer coagulant which is a copolymer of a carboxylic acid-based monomer and an acrylic monomer has been proposed, but this method also has a problem in which the impact strength and surface gloss characteristics of an ABS graft copolymer are degraded.

DISCLOSURE

Technical Problem

The present invention provides an acrylic copolymer coagulant capable of improving the impact strength, surface gloss characteristics, processability, and latex stability of a graft copolymer.

Technical Solution

One aspect of the present invention provides an acrylic copolymer coagulant which is a copolymer of a monomer mixture comprising a carboxylic acid-based monomer and an acrylic monomer represented by Chemical Formula 1 below, wherein a content X of a carboxylic acid-based monomer unit in the acrylic copolymer coagulant satisfies Expression 1 below, and an average particle diameter Y of the acrylic copolymer coagulant satisfies Expression 2 below:

<Chemical Formula 1>

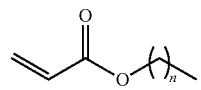

In Chemical Formula 1,
n is 0 or 1.

$$2+(n+1)^2-0.5(n+1) \leq X \leq 2+(n+1)^2+0.5(n+1) \quad \text{<Expression 1>}$$

$$\{20.817\times(n+1)^2-27.35\times(n+1)+28.433\}/X\times 10-1.5 \leq Y \leq \{20.817\times(n+1)^2-27.35\times(n+1)+28.433\}/X\times 10+1.5 \quad \text{<Expression 2>}$$

In Expressions 1 and 2,
n is an n value of Chemical Formula 1,
X is a content of a carboxylic acid-based monomer unit in the acrylic copolymer coagulant (units: wt %), and
Y is an average particle diameter of the acrylic copolymer coagulant (units: nm).

Another aspect of the present invention provides a method of preparing a graft copolymer, which comprises: preparing a second diene-based rubber polymer by coagulation of a first diene-based rubber polymer with the above-described acrylic copolymer coagulant; and preparing a graft copolymer by graft polymerization of the second diene-based rubber polymer with an aromatic vinyl-based monomer and a vinyl cyanide-based monomer.

Advantageous Effects

An acrylic copolymer coagulant according to the present invention is formed so that the content of a carboxylic acid-based monomer unit and the average particle diameter of the acrylic copolymer coagulant satisfy specific ranges according to the number of carbon atoms of an acrylic monomer which is a raw material. When such an acrylic copolymer coagulant of the present invention is used, a graft copolymer excellent in impact strength, surface gloss characteristics, processability, and appearance characteristics can be prepared, and the latex stability of the prepared graft copolymer can also be improved.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the average particle diameters of an acrylic copolymer coagulant and first and second diene-based rubber polymers may be measured by a dynamic light scattering method, specifically, by using Nicomp 380 HPL (manufactured by Nicomp). In the specification, an average particle diameter may refer to an arithmetic average particle diameter in the particle size distribution as measured by a dynamic light scattering method, specifically, an average particle diameter measured in the scattering intensity distribution.

In the present invention, a carboxylic acid-based monomer may be one or more selected from the group consisting of acrylic acid, methacrylic acid, itaconic acid, crotonic acid, fumaric acid, and maleic acid, with methacrylic acid being preferred.

In the present invention, a carboxylic acid-based monomer unit may refer to a unit derived from the carboxylic acid-based monomer.

In the present invention, the weight-average molecular weight of an acrylic copolymer coagulant may be measured by gel permeation chromatography (GPC) analysis after an acrylic copolymer coagulant latex is dissolved in tetrahydrofuran (THF) at a concentration of 2 mg/ml, stirred for 12 hours, and filtered through a 45-nm polytetrafluoroethylene filter.

In the present invention, a first diene-based rubber polymer is formed of a diene-based monomer, and the diene-based monomer may be one or more selected from the group consisting of 1,3-butadiene, isoprene, chloroprene, and piperylene, with 1,3-butadiene being preferred.

In the present invention, an aromatic vinyl-based monomer may be one or more selected from the group consisting of styrene, α-methylstyrene, α-ethylstyrene, and p-methylstyrene, with styrene being preferred.

In the present invention, an aromatic vinyl-based monomer unit may refer to a unit derived from the aromatic vinyl-based monomer.

In the present invention, a vinyl cyanide-based monomer may be one or more selected from the group consisting of acrylonitrile, 2-methylacrylonitrile, 3-phenyl-acrylonitrile, and α-chloroacrylonitrile, with acrylonitrile being preferred.

In the present invention, a vinyl cyanide-based monomer unit may refer to a unit derived from the vinyl cyanide-based monomer.

Hereinafter, the present invention will be described in detail with reference to embodiments so that those skilled in the art can easily carry out the present invention. However, the present invention may be embodied in several different forms, and therefore, is not limited to embodiments described herein.

1. Acrylic Copolymer Coagulant

An acrylic copolymer coagulant according to an embodiment of the present invention is a copolymer of a monomer mixture comprising a carboxylic acid-based monomer and an acrylic monomer represented by Chemical Formula 1 below, wherein the content X of a carboxylic acid-based monomer unit in the acrylic copolymer coagulant satisfies Expression 1 below, and the average particle diameter Y of the acrylic copolymer coagulant satisfies Expression 2 below.

<Chemical Formula 1>

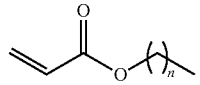

In Chemical Formula 1,
n is 0 or 1.

$$2+(n+1)^2-0.5(n+1) \leq X \leq 2+(n+1)^2+0.5(n+1)$$ <Expression 1>

$$\{20.817 \times (n+1)^2 - 27.35 \times (n+1) + 28.433\}/X \times 10 - 1.5 \leq Y \leq \{20.817 \times (n+1)^2 - 27.35 \times (n+1) + 28.433\}/X \times 10 + 1.5$$ <Expression 2>

In Expressions 1 and 2,
n is an n value of Chemical Formula 1,
X is a content of a carboxylic acid-based monomer unit in the acrylic copolymer coagulant (units: wt %), and
Y is an average particle diameter of the acrylic copolymer coagulant (units: nm).

As described above, when an acrylic copolymer coagulant is used, the generation of aggregates can be reduced during coagulation of a diene-based rubber polymer, but there is a problem in which the impact strength and surface gloss characteristics of a graft copolymer are degraded. However, the inventors of the present invention have conducted research on an acrylic copolymer coagulant and found that when the acrylic copolymer coagulant is adjusted to have a specific composition and a specific average particle diameter, a graft copolymer excellent in impact strength, surface gloss characteristics, processability, and appearance characteristics can be prepared. Therefore, the present invention has been completed based on this fact.

Hereinafter, each component of the acrylic copolymer coagulant according to an embodiment of the present invention will be described in detail.

The acrylic copolymer coagulant is a copolymer of a monomer mixture comprising a carboxylic acid-based monomer and an acrylic monomer represented by Chemical Formula 1, wherein the content X of a carboxylic acid-based monomer unit in the acrylic copolymer coagulant satisfies Expression 1, and the average particle diameter Y of the acrylic copolymer coagulant satisfies Expression 2.

When the acrylic copolymer coagulant satisfies all of Chemical Formula 1, Expression 1, and Expression 2, a graft copolymer excellent in impact strength, surface gloss characteristics, processability, and appearance characteristics can be prepared.

However, when the monomer mixture comprises an acrylic monomer not represented by Chemical Formula 1, it is necessary to use an excessive amount of a carboxylic acid-based monomer having the characteristics of coagulating other substances, and thus foreign matter such as gels and the like are excessively generated in a graft copolymer, leading to degraded appearance characteristics. In addition, the surface gloss characteristics of a graft copolymer may be substantially degraded.

When the content X of a carboxylic acid-based monomer unit in the acrylic copolymer coagulant is below the range of Expression 1, even when the usage amount of the acrylic copolymer coagulant increases, it is not possible to enlarge a first diene-based rubber polymer so as to have a desired average particle diameter. As a result, the impact strength and surface gloss characteristics of a graft copolymer may be degraded. Also, since an amount of aggregates increases in preparation of a graft copolymer, a process of removing the aggregates is additionally required, and thus production efficiency may be degraded. When the content X of a carboxylic acid-based monomer unit in the acrylic copolymer coagulant is above the range of Expression 1, an aggregation phenomenon occurs during enlargement of a first diene-based rubber polymer, and thus it is not possible to prepare a graft copolymer.

When the average particle diameter Y of the acrylic copolymer coagulant is below or above the range of Expression 2, the impact strength and surface gloss characteristics of a graft copolymer may be substantially degraded.

Meanwhile, when the acrylic copolymer coagulant is a copolymer of a monomer mixture comprising a carboxylic acid-based monomer and methyl acrylate, the content X of a carboxylic acid-based monomer unit in the acrylic copolymer coagulant may be in a range of 2.5 wt % to 3.5 wt %. When the content X is below the above-described range, even when the usage amount of the acrylic copolymer coagulant increases, it is not possible to enlarge a first diene-based rubber polymer so as to have a desired average particle diameter. As a result, the impact strength and surface gloss characteristics of a graft copolymer may be degraded. Also, since an amount of aggregates increases in preparation of a graft copolymer, a process of removing the aggregates is additionally required, and thus production efficiency may be degraded. When the content X is above the above-described range, an aggregation phenomenon occurs during enlargement of a first diene-based rubber polymer, and thus it is not possible to prepare a graft copolymer.

When the acrylic copolymer coagulant is a copolymer of a monomer mixture comprising a carboxylic acid-based monomer and methyl acrylate, and the content X of a carboxylic acid-based monomer unit in the acrylic copolymer coagulant is in a range of 2.5 wt % to 3.5 wt %, the average particle diameter Y of the acrylic copolymer coagulant may be in a range of 80 nm to 115.5 nm. When the average particle diameter Y does not satisfy the above-described range, the impact strength and surface gloss characteristics of a graft copolymer may be substantially degraded.

Specifically, when the acrylic copolymer coagulant is a copolymer of a monomer mixture comprising a carboxylic acid-based monomer and methyl acrylate, and the content X of a carboxylic acid-based monomer unit in the acrylic copolymer coagulant is 2.5 wt %, the average particle diameter of the acrylic copolymer coagulant may be in a range of 86.1 nm to 89.1 nm. In addition, when the acrylic copolymer coagulant is a copolymer of a monomer mixture comprising a carboxylic acid-based monomer and methyl acrylate, and the content X of a carboxylic acid-based monomer unit in the acrylic copolymer coagulant is 3 wt %, the average particle diameter of the acrylic copolymer coagulant may be in a range of 71.5 nm to 74.5 nm. Additionally, when the acrylic copolymer coagulant is a copolymer of a monomer mixture comprising a carboxylic acid-based monomer and methyl acrylate, and the content X of a carboxylic acid-based monomer unit in the acrylic copolymer coagulant is 3.5 wt %, the average particle diameter of the acrylic copolymer coagulant may be in a range of 61.5 nm to 64 nm.

When the acrylic copolymer coagulant is a copolymer of a monomer mixture comprising a carboxylic acid-based monomer and methyl acrylate, and the content X of a carboxylic acid-based monomer unit in the acrylic copolymer coagulant is in a range of 2.5 wt % to 3.5 wt %, the acrylic copolymer coagulant may have a weight-average molecular weight of 700,000 g/mol to 950,000 g/mol or 700,000 g/mol to 930,000 g/mol. When the above-described range is satisfied, a graft copolymer with excellent processability can be prepared.

Meanwhile, when the acrylic copolymer coagulant is a copolymer of a monomer mixture comprising a carboxylic acid-based monomer and ethyl acrylate, the content X of a carboxylic acid-based monomer unit in the acrylic copolymer coagulant may be in a range of 5 wt % to 7 wt %. When the content X is below the above-described range, even when the usage amount of the acrylic copolymer coagulant increases, it is not possible to enlarge a first diene-based rubber polymer so as to have a desired average particle diameter. As a result, the impact strength and surface gloss characteristics of a graft copolymer may be degraded. Also, since an amount of aggregates increases in preparation of a graft copolymer, a process of removing the aggregates is additionally required, and thus production efficiency may be degraded. When the content X is above the above-described range, an aggregation phenomenon occurs during enlargement of a first diene-based rubber polymer, and thus it is not possible to prepare a graft copolymer.

In addition, when the acrylic copolymer coagulant is a copolymer of a monomer mixture comprising a carboxylic acid-based monomer and ethyl acrylate, and the content X of a carboxylic acid-based monomer unit in the acrylic copolymer coagulant is in a range of 5 wt % to 7 wt %, the average particle diameter Y of the acrylic copolymer coagulant may be in a range of 80 nm to 115.5 nm. When the average particle diameter Y does not satisfy the above-described range, the impact strength and surface gloss characteristics of a graft copolymer may be substantially degraded.

Specifically, when the acrylic copolymer coagulant is a copolymer of a monomer mixture comprising a carboxylic acid-based monomer and ethyl acrylate, and the content X of a carboxylic acid-based monomer unit in the acrylic copolymer coagulant is 5 wt %, the average particle diameter of the acrylic copolymer coagulant may be in a range of 112.5 nm to 115.5 nm. In addition, when the acrylic copolymer coagulant is a copolymer of a monomer mixture comprising a carboxylic acid-based monomer and ethyl acrylate, and the content X of a carboxylic acid-based monomer unit in the acrylic copolymer coagulant is 5.5 wt %, the average particle diameter of the acrylic copolymer coagulant may be in a range of 102.5 nm to 105 nm. Additionally, when the acrylic copolymer coagulant is a copolymer of a monomer mixture comprising a carboxylic acid-based monomer and ethyl acrylate, and the content X of a carboxylic acid-based monomer unit in the acrylic copolymer coagulant is 6 wt %, the average particle diameter of the acrylic copolymer coagulant may be in a range of 93 nm to 96.5 nm. In addition, when the acrylic copolymer coagulant is a copolymer of a monomer mixture comprising a carboxylic acid-based monomer and ethyl acrylate, and the content X of a carboxylic acid-based monomer unit in the acrylic copolymer coagulant is 6.5 wt %, the average particle diameter of the acrylic copolymer coagulant may be in a range of 86.5 nm to 89 nm. Additionally, when the acrylic copolymer coagulant is a copolymer of a monomer mixture comprising ethyl acrylate and a carboxylic acid-based monomer, and the content X of a carboxylic acid-based monomer unit in the acrylic copolymer coagulant is 7 wt %, the average particle diameter of the acrylic copolymer coagulant may be in a range of 80 nm to 82.5 nm.

When the acrylic copolymer coagulant is a copolymer of a monomer mixture comprising a carboxylic acid-based monomer and ethyl acrylate, and the content X of a carboxylic acid-based monomer unit in the acrylic copolymer coagulant is in a range of 5 wt % to 7 wt %, the acrylic copolymer coagulant may have a weight-average molecular weight of 250,000 g/mol to 350,000 g/mol or 290,000 g/mol to 340,000 g/mol. When the above-described range is satisfied, a graft copolymer with excellent processability can be prepared.

Meanwhile, the upper limit and lower limit of Y in Expression 2 may be indicated to have significant figures up to one decimal place.

2. Preparation of Acrylic Copolymer Coagulant

The acrylic copolymer coagulant according to an embodiment of the present invention may be prepared by a method comprising: providing a polymerization solution containing a monomer mixture comprising a carboxylic acid-based monomer and an acrylic monomer represented by Chemical Formula 1 and a first emulsifier; and adding a second emulsifier to a reactor and then performing polymerization while continuously adding the polymerization solution.

The content of the carboxylic acid-based monomer in the monomer mixture may be the same as the content of the carboxylic acid-based monomer unit in the acrylic copolymer coagulant.

Meanwhile, the total amount of the first emulsifier and second emulsifier may be 0.2 to 0.6 parts by weight or 0.3 to 0.5 parts by weight with respect to 100 parts by weight of the monomer mixture. When the above-described range is satisfied, the average particle diameter of the acrylic copolymer coagulant may be easily adjusted to satisfy Expression 2. Also, a first diene-based rubber polymer may be easily enlarged to have a desired average particle diameter while the generation of aggregates is minimized during enlargement of the first diene-based rubber polymer.

When the acrylic copolymer coagulant is a copolymer of a monomer mixture comprising a carboxylic acid-based monomer and methyl acrylate, and the content X of a carboxylic acid-based monomer unit in the acrylic copolymer coagulant is 2.5 wt %, the weight ratio of a first emulsifier and a second emulsifier may be 55.5:44.5 to 57.5:42.5. When the acrylic copolymer coagulant is a copolymer of a monomer mixture comprising a carboxylic acid-based monomer and methyl acrylate, and the content X of a carboxylic acid-based monomer unit in the acrylic copolymer coagulant is 3 wt %, the weight ratio of a first emulsifier and a second emulsifier may be 47.75:52.25 to 52:48. When the acrylic copolymer coagulant is a copolymer of a monomer mixture comprising a carboxylic acid-based monomer and methyl acrylate, and the content X of a carboxylic acid-based monomer unit in the acrylic copolymer coagulant is 3.5 wt %, the weight ratio of a first emulsifier and a second emulsifier may be 20:80 to 26.75:73.25. When the above-described range is satisfied, an acrylic copolymer coagulant having an average particle diameter satisfying Expression 2 can be prepared.

When the acrylic copolymer coagulant is a copolymer of a monomer mixture comprising a carboxylic acid-based monomer and ethyl acrylate, and the content X of a carboxylic acid-based monomer unit in the acrylic copolymer coagulant is 5 wt %, the weight ratio of a first emulsifier and a second emulsifier may be 78:22 to 78.75:21.25. When the acrylic copolymer coagulant is a copolymer of a monomer mixture comprising a carboxylic acid-based monomer and ethyl acrylate, and the content X of a carboxylic acid-based monomer unit in the acrylic copolymer coagulant is 6 wt %, the weight ratio of a first emulsifier and a second emulsifier may be 20:80 to 26.75:73.25. When the acrylic copolymer coagulant is a copolymer of a monomer mixture comprising a carboxylic acid-based monomer and ethyl acrylate, and the content X of a carboxylic acid-based monomer unit in the acrylic copolymer coagulant is 7 wt %, the weight ratio of a first emulsifier and a second emulsifier may be 78:22 to 78.25:21.75. When the above-described range is satisfied, an acrylic copolymer coagulant having an average particle diameter satisfying Expression 2 can be prepared.

Meanwhile, the first emulsifier and the second emulsifier may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl benzene sulfate, sodium octadecyl sulfate, sodium oleyl sulfate, sodium dodecyl sulfate, potassium octadecyl sulfate, potassium rosinate, and sodium rosinate, with sodium dodecyl benzene sulfonate being preferred.

Meanwhile, the polymerization solution may further comprise an initiator and water.

The initiator may be one or more selected from the group consisting of sodium persulfate, potassium persulfate, ammonium persulfate, potassium superphosphate, hydrogen peroxide, t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethyl hexanol peroxide, t-butyl peroxy isobutyrate, azobisisobutyronitrile, azobis-2,4-dimethylvaleronitrile, azobis cyclohexane carbonitrile, and azobis methyl isobutyrate, with potassium persulfate being preferred.

The initiator may be added in an amount of 0.02 to 2 parts by weight or 0.07 to 0.8 parts by weight with respect to 100 parts by weight of the monomer mixture, with the range of 0.07 to 0.8 parts by weight being preferred. When the above-described range is satisfied, the copolymer of the monomer mixture has an appropriate weight-average molecular weight, and thus a diene-based rubber polymer can be easily enlarged.

The water may be ion exchanged water.

Before the polymerization solution is added to the reactor, water may be additionally added.

3. Method of Preparing Graft Copolymer

A method of preparing a graft copolymer according to another embodiment of the present invention comprises: preparing a second diene-based rubber polymer by coagulation of a first diene-based rubber polymer with the acrylic copolymer coagulant according to an embodiment of the present invention; and preparing a graft copolymer by graft polymerization of the second diene-based rubber polymer with an aromatic vinyl-based monomer and a vinyl cyanide-based monomer.

The first diene-based rubber polymer may have an average particle diameter of 80 nm to 120 nm or 90 nm to 110 nm, with the range of 90 nm to 110 nm being preferred. When the above-described range is satisfied, a problem in which productivity is degraded due to a polymerization time excessively prolonged in preparation of the first diene-based rubber polymer can be solved. Also, when the acrylic copolymer coagulant is used, the first diene-based rubber polymer can be easily enlarged to have a desired average particle diameter.

The second diene-based rubber polymer may have an average particle diameter of 250 nm to 400 nm or 280 nm to 350 nm, with the range of 280 nm to 350 nm being preferred. When the above-described range is satisfied, a graft copolymer excellent in impact strength and surface gloss characteristics can be prepared.

The acrylic copolymer coagulant may coagulate the first diene-based rubber polymer in an amount of 0.1 to 2 parts by weight or 0.5 to 1.5 parts by weight with respect to 60 parts by weight of the first diene-based rubber polymer, with the range of 0.5 to 1.5 parts by weight being preferred. When the above-described range is satisfied, the first diene-based rubber polymer can be easily coagulated, and an aggregation phenomenon cannot occur.

The acrylic copolymer coagulant and the first diene-based rubber polymer may be in a latex form, and the contents thereof are based on solid content.

In the step of preparing a graft copolymer, one or more selected from the group consisting of an initiator, a redox-based catalyst, and water may be further added.

The types of the initiator have been described above, and cumene hydroperoxide is preferred.

The initiator may be added in an amount of 0.01 to 0.5 parts by weight or 0.03 to 0.3 parts by weight with respect to 100 parts by weight of the sum of the first diene-based rubber polymer, the aromatic vinyl-based monomer, and the vinyl cyanide-based monomer, with the range of 0.03 to 0.3 parts by weight being preferred. When the above-described range is satisfied, emulsion polymerization can be facilitated, and the amount of the initiator remaining in the prepared graft copolymer can be minimized.

The redox-based catalyst may be one or more selected from the group consisting of sodium formaldehyde sulfoxylate, disodium dihydrogen ethylenediaminetetraacetate, ferrous sulfate, dextrose, sodium pyrophosphate, anhydrous sodium pyrophosphate, and sodium sulfate, with one or more selected from the group consisting of sodium formaldehyde sulfoxylate, disodium dihydrogen ethylenediaminetetraacetate, and ferrous sulfate being preferred.

The redox-based catalyst may be added in an amount of 0.01 to 0.5 parts by weight or 0.03 to 0.3 parts by weight with respect to 100 parts by weight of the sum of the first diene-based rubber polymer, the aromatic vinyl-based monomer, and the vinyl cyanide-based monomer, with the range of 0.03 to 0.3 parts by weight being preferred. When the above-described range is satisfied, polymerization may be easily initiated at relatively low temperatures.

The water may be ion exchanged water.

After the polymerization of the graft copolymer is completed, coagulation, aging, washing, drying processes may be further performed to obtain a graft copolymer in a powder form.

Hereinafter, exemplary embodiments of the present invention will be described in order to aid in understanding the present invention. However, it is apparent to those skilled in the art that the following embodiments are merely presented to exemplify the present invention, and various changes and modifications can be made to the exemplary embodiments of the present invention without departing from the scope and spirit of the present invention, so that the present invention covers all such changes and modifications provided they are within the scope of the appended claims.

EXAMPLES AND COMPARATIVE EXAMPLES

<Preparation of Acrylic Copolymer Coagulant>

100 parts by weight of a monomer mixture comprising methacrylic acid (MAA), methyl acrylate (MA), ethyl acrylate (EA), and butyl acrylate (BA) in contents shown in Tables 1 to 16 below, 0.4 parts by weight of potassium persulfate, 170 parts by weight of ion exchanged water, and sodium dodecyl benzene sulfonate as a first emulsifier in a content shown in Tables 1 to 16 below were uniformly mixed to prepare a polymerization solution.

170 parts by weight of ion exchanged water and sodium dodecyl benzene sulfonate as a second emulsifier in a content shown in Tables 1 to 16 below were added to a nitrogen-substituted polymerization reactor, and the temperature inside the reactor was raised to 80° C. Polymerization was performed while continuously adding the polymerization solution to the reactor at a predetermined rate for 5 hours to prepare an acrylic copolymer coagulant latex.

<Preparation of Second Butadiene-Based Rubber Polymer>

60 parts by weight (based on solid content) of a first butadiene rubber polymer latex having an average particle diameter of 103 nm was heated to 50° C. while stirring. Then, a coagulant was added in a content (based on solid content) shown in Tables 1 to 16 below, and aging was performed for 15 minutes. Afterward, 0.18 parts by weight of KOH was added, and aging was performed for 5 minutes while stirring to prepare a second butadiene rubber polymer latex.

<Preparation of Graft Copolymer>

The whole amount of the second butadiene rubber polymer latex, 3 parts by weight of styrene, 1 part by weight of acrylonitrile, and 93.9 parts by weight of ion exchanged water were added to a nitrogen-substituted reactor and then stirred. Subsequently, 0.12 parts by weight of cumene hydroperoxide and, as redox-based catalysts, 0.11 parts by weight of dextrose, 0.08 parts by weight of sodium pyrophosphate, and 0.0016 parts by weight of ferrous sulfate were batch-added. Then, the reactor was heated to 70° C. for 50 minutes. Subsequently, 27 parts by weight of styrene and 9 parts by weight of acrylonitrile were continuously added at a predetermined rate for 90 minutes, and then the reaction was terminated to prepare a graft copolymer latex.

The graft copolymer latex was subjected to coagulation with $MgSO_4$, aging, washing, dehydration, and drying to prepare a graft copolymer powder.

<Preparation of Thermoplastic Resin Composition>

25 parts by weight of the graft copolymer powder and 75 parts by weight of 92HR (commercially available from LG Chem Ltd., styrene/acrylonitrile copolymer) were mixed to prepare a thermoplastic resin composition.

Experimental Example 1

Properties of the acrylic copolymer coagulants of Examples and Comparative Examples were evaluated by methods described below, and results thereof are shown in Tables.

(1) Average particle diameter (nm): measured by a dynamic light scattering method using a Nicomp 380 HPL instrument (manufactured by Nicomp).

(2) Weight-average molecular weight (g/mol): measured by gel permeation chromatography (GPC) analysis after the acrylic copolymer coagulant latex was dissolved in tetrahydrofuran (THF) at a concentration of 2 mg/ml, stirred for 12 hours, and filtered through a 45-nm polytetrafluoroethylene filter.

(3) Polymerization conversion rate (%): determined by drying 1 g of the acrylic copolymer coagulant latex in an oven set at 135° C. for 20 minutes, measuring a solid content, and dividing the measured solid content by a theoretical solid content (target TSC).

Experimental Example 2

Physical properties of the second butadiene rubber polymer latex of Examples and Comparative Examples were measured by methods described below, and results thereof are shown in Tables.

(4) Aggregation phenomenon: When the measured amount (ppm) of aggregates is 30,000 ppm or more or when phase separation was visually observed during the stirring of the second butadiene rubber polymer latex, it was determined that an aggregation phenomenon occurred.

(5) Average particle diameter (nm): measured by a dynamic light scattering method using a Nicomp 380 HPL instrument (manufactured by Nicomp).

(6) Particle size distribution: measured by a dynamic light scattering method using a Nicomp 380 HPL instrument (manufactured by Nicomp).

Experimental Example 3

A property of graft copolymers of Examples and Comparative Examples was measured by a method described below, and results thereof are shown in Tables.

(7) Amount of aggregate (ppm): The graft copolymer latex was filtered through a 100-mesh sieve, placed in a convection oven, and allowed to stand at 80° C. for 720 minutes. Afterward, aggregates filtered on the 100-meth sieve were weighed, and the amount of aggregates for the graft copolymer latex was calculated by the following equation.

Amount of aggregate (ppm)={(Weight of aggregates filtered on 100-mesh sieve)/(Total theoretical weight of butadiene rubber polymer, styrene, acrylonitrile, and additives added in preparation of graft copolymer)}×1,000,000

Experimental Example 4

Each of the thermoplastic resin compositions of Examples and Comparative Examples was extruded to prepare a pellet. A property of the pellet was measured by a method described below, and results thereof are shown in Tables.

(8) Melt flow index (g/10 min): measured in accordance with ASTM D1238 at 220° C. and 10 kg.

Experimental Example 5

Each of the thermoplastic resin compositions of Examples and Comparative Examples was extruded and injection-molded to prepare a specimen. Properties of the specimen were measured by methods described below, and results thereof are shown in Table.

(9) Impact strength (kg m/m, ¼ In): measured in accordance with ASTM D256.

(10) Surface gloss characteristics: determined in accordance with ASTM D523 by measuring the injection-molded specimen at 45° using a gloss meter instrument (VG-7000+ Cu-2 manufactured by Nippon Denshoku Industries Co., Ltd.).

(11) Gel evaluation: The pellet was extruded into a film in a film extruder and simultaneously evaluated in real time using an optical gel counter, and the size and number per unit area of gels were measured and evaluated. Evaluation criteria are as follows.

○: Gel size of 100 μm or more and 100 or less gels
Δ: Gel size of 100 μm or more and 250 or less gels
x: Gel size of 100 μm or more and more than 250 gels

TABLE 1

| Classification | | | Comparative Examples | | | |
|---|---|---|---|---|---|---|
| | | | 1 | 2 | 3 | 4 |
| Acrylic coagulant | Monomer mixture | MAA | 2 | 2 | 2.5 | 2.5 |
| | | MA | 98 | 98 | 97.5 | 97.5 |
| | | EA | — | — | — | — |
| | | BA | — | — | — | — |
| | First emulsifier (parts by weight) | | 0.299 | 0.299 | 0.207 | 0.219 |
| | Second emulsifier (parts by weight) | | 0.101 | 74.75 | 0.193 | 0.181 |
| | n of Chemical Formula 1 | | | 0 | | |
| | X of Expression 1 | | | 2.5~3.5 | | |
| | Y of Expression 2 | | 108~111 | | 86.1~89.1 | |
| | (1) Average particle diameter | | 110 | 100 | 75 | 85.5 |
| | (2) Weight-average molecular weight | | 921,000 | 921,000 | 909,000 | 890,000 |
| | (3) Polymerization conversion rate | | 99.7 | 99.9 | 99.9 | 99.8 |
| | Addition amount of coagulant (parts by weight) | | 0.66 | 0.66 | 0.66 | 0.66 |
| Second diene-based rubber polymer | (4) Aggregation phenomenon | | x | x | x | x |
| | (5) Average particle diameter | | 198 | 220 | 284 | 288 |
| | (6) Particle size distribution | | 0.68 | 0.59 | 0.64 | 0.66 |
| | (7) Amount of aggregate | | 730 | 400 | 350 | 120 |

TABLE 1-continued

|  | Classification | Comparative Examples | | | |
|---|---|---|---|---|---|
|  |  | 1 | 2 | 3 | 4 |
| Thermoplastic resin composition | (8) Melt flow index | 15 | 15.8 | 16.9 | 17.4 |
|  | (9) Impact strength | 8.9 | 12.7 | 21.3 | 23.3 |
|  | (10) Surface gloss characteristics | 92.3 | 89.6 | 90.9 | 97 |
|  | (11) Gel evaluation | ○ | Δ | ○ | ○ |

TABLE 2

| Classification | | | Examples | | |
|---|---|---|---|---|---|
|  |  |  | 1 | 2 | 3 |
| Acrylic copolymer coagulant | Monomer mixture | MAA | 2.5 | 2.5 | 2.5 |
|  |  | MA | 97.5 | 97.5 | 97.5 |
|  |  | EA | — | — | — |
|  |  | BA | — | — | — |
|  | First emulsifier (parts by weight) | | 0.222 | 0.225 | 0.23 |
|  | Second emulsifier (parts by weight) | | 0.178 | 0.175 | 0.17 |
|  | n of Chemical Formula 1 | | | 0 | |
|  | X of Expression 1 | | | 2.5~3.5 | |
|  | Y of Expression 2 | | | 86.1~89.1 | |
|  | (1) Average particle diameter | | 86.5 | 88 | 89 |
|  | (2) Weight-average molecular weight | | 912,000 | 918,000 | 909,000 |
|  | (3) Polymerization conversion rate | | 99.7 | 99.9 | 99.9 |
|  | Addition amount of coagulant (parts by weight) | | 0.66 | 0.66 | 0.66 |
| Second diene-based rubber polymer | (4) Aggregation phenomenon | | × | × | × |
|  | (5) Average particle diameter | | 299 | 289 | 300 |
|  | (6) Particle size distribution | | 0.65 | 0.64 | 0.61 |
|  | (7) Amount of aggregate | | 120 | 95 | 200 |
| Thermoplastic resin composition | (8) Melt flow index | | 18.1 | 18 | 17.9 |
|  | (9) Impact strength | | 30.8 | 31 | 32.2 |
|  | (10) Surface gloss characteristics | | 98.0 | 98.8 | 98.9 |
|  | (11) Gel evaluation | | ○ | ○ | ○ |

TABLE 3

| Classification | | | Comparative Examples | | | | |
|---|---|---|---|---|---|---|---|
|  |  |  | 5 | 6 | 7 | 8 | 9 |
| Acrylic copolymer coagulant | Monomer mixture | MAA | 2.5 | 2.5 | 3 | 3 | 3 |
|  |  | MA | 97.5 | 97.5 | 97 | 97 | 97 |
|  |  | EA | — | — | — | — | — |
|  |  | BA | — | — | — | — | — |
|  | First emulsifier (parts by weight) | | 0.232 | 0.3 | 0.14 | 0.19 | 0.189 |
|  | Second emulsifier (parts by weight) | | 0.168 | 0.1 | 0.26 | 0.21 | 0.211 |
|  | n of Chemical Formula 1 | | | | 0 | | |
|  | X of Expression 1 | | | | 2.5~3.5 | | |
|  | Y of Expression 2 | | 86.1~89.1 | | | 71.5~74.5 | |
|  | (1) Average particle diameter | | 89.5 | 100 | 67 | 70.5 | 71 |
|  | (2) Weight-average molecular weight | | 901,000 | 911,000 | 830,000 | 801,000 | 800,000 |
|  | (3) Polymerization conversion rate | | 99.7 | 99.9 | 99.9 | 100 | 99.9 |
|  | Addition amount of coagulant (parts by weight) | | 0.66 | 0.66 | 0.66 | 0.66 | 0.66 |
| Second diene-based rubber polymer | (4) Aggregation phenomenon | | × | × | × | × | × |
|  | (5) Average particle diameter | | 290 | 297 | 300 | 299 | 297 |
|  | (6) Particle size distribution | | 0.66 | 0.66 | 0.54 | 0.54 | 0.59 |
|  | (7) Amount of aggregate | | 100 | 200 | 380 | 400 | 200 |
| Thermoplastic resin composition | (8) Melt flow index | | 17.4 | 17.4 | 16.5 | 16 | 16.1 |
|  | (9) Impact strength | | 24 | 22 | 22.2 | 23 | 23.2 |
|  | (10) Surface gloss characteristics | | 97.2 | 96.2 | 97.2 | 97.3 | 97.3 |
|  | (11) Gel evaluation | | ? | ? | ? | ? | ? |

TABLE 4

| Classification | | | Examples 4 | 5 | 6 |
|---|---|---|---|---|---|
| Acrylic copolymer coagulant | Monomer mixture | MAA | 3 | 3 | 3 |
| | | MA | 97 | 97 | 97 |
| | | EA | — | — | — |
| | | BA | — | — | — |
| | First emulsifier (parts by weight) | | 0.191 | 0.2 | 0.208 |
| | Second emulsifier (parts by weight) | | 0.209 | 0.2 | 0.192 |
| | n of Chemical Formula 1 | | | 0 | |
| | X of Expression 1 | | | 2.5~3.5 | |
| | Y of Expression 2 | | | 71.5~74.5 | |
| | (1) Average particle diameter | | 71.5 | 73 | 74.5 |
| | (2) Weight-average molecular weight | | 817,000 | 825,000 | 820,000 |
| | (3) Polymerization conversion rate | | 99.8 | 99.7 | 99.7 |
| | Addition amount of coagulant (parts by weight) | | 0.66 | 0.66 | 0.66 |
| Second diene-based rubber polymer | (4) Aggregation phenomenon | | × | × | × |
| | (5) Average particle diameter | | 301 | 296 | 310 |
| | (6) Particle size distribution | | 0.62 | 0.63 | 0.6 |
| | (7) Amount of aggregate | | 200 | 100 | 100 |
| Thermoplastic resin composition | (8) Melt flow index | | 17.9 | 17.7 | 18 |
| | (9) Impact strength | | 32.2 | 31.6 | 30.4 |
| | (10) Surface gloss characteristics | | 98.2 | 99 | 98.7 |
| | (11) Gel evaluation | | ⊚ | ⊚ | ⊚ |

TABLE 5

| Classification | | | Comparative Examples 10 | 11 | 12 | 13 |
|---|---|---|---|---|---|---|
| Acrylic coagulant | Monomer mixture | MAA | 3 | 3 | 3.5 | 3.5 |
| | | MA | 97 | 97 | 96.5 | 96.5 |
| | | EA | — | — | — | — |
| | | BA | — | — | — | — |
| | First emulsifier (parts by weight) | | 0.21 | 0.25 | 0.05 | 0.056 |
| | Second emulsifier (parts by weight) | | 0.19 | 0.15 | 0.35 | 0.344 |
| | n of Chemical Formula 1 | | | 0 | | |
| | X of Expression 1 | | | 2.5~3.5 | | |
| | Y of Expression 2 | | 71.5~74.5 | | about 61.07~64.07 | |
| | (1) Average particle diameter | | 75 | 85 | 59 | 60.5 |
| | (2) Weight-average molecular weight | | 811,000 | 819,000 | 708,000 | 710,000 |
| | (3) Polymerization conversion rate | | 99.9 | 99.9 | 99.9 | >99.9 |
| | Addition amount of coagulant (parts by weight) | | 0.66 | 0.66 | 0.66 | 0.66 |
| Second diene-based rubber polymer | (4) Aggregation phenomenon | | × | × | × | × |
| | (5) Average particle diameter | | 288 | 271 | 256 | 270 |
| | (6) Particle size distribution | | 0.59 | 0.61 | 0.56 | 0.6 |
| | (7) Amount of aggregate | | 210 | 390 | 450 | 290 |
| Thermoplastic resin composition | (8) Melt flow index | | 14.7 | 17.2 | 15.5 | 16.2 |
| | (9) Impact strength | | 23.7 | 19.9 | 8.9 | 16.6 |
| | (10) Surface gloss characteristics | | 97 | 97.1 | 95.5 | 95.4 |
| | (11) Gel evaluation | | ⊚ | ⊚ | Δ | Δ |

TABLE 6

| Classification | | | Examples 7 | 8 | 9 | 10 |
|---|---|---|---|---|---|---|
| Acrylic coagulant | Monomer mixture | MAA | 3.5 | 3.5 | 3.5 | 3.5 |
| | | MA | 96.5 | 96.5 | 96.5 | 96.5 |
| | | EA | — | — | — | — |
| | | BA | — | — | — | — |
| | First emulsifier (parts by weight) | | 0.08 | 0.1 | 0.109 | 0.107 |
| | Second emulsifier (parts by weight) | | 0.32 | 0.3 | 0.291 | 0.293 |
| | n of Chemical Formula 1 | | | 0 | | |
| | X of Expression 1 | | | 2.5~3.5 | | |
| | Y of Expression 2 | | | about 61.07~64.07 | | |
| | (1) Average particle diameter | | 61.5 | 63 | 63.5 | 64 |
| | (2) Weight-average molecular weight | | 707,000 | 719,000 | 710,000 | 706,000 |
| | (3) Polymerization conversion rate | | 99.8 | 100 | 99.9 | >99.9 |
| | Addition amount of coagulant (parts by weight) | | 0.66 | 0.66 | 0.66 | 0.55 |
| Second diene-based rubber polymer | (4) Aggregation phenomenon | | × | × | × | × |
| | (5) Average particle diameter | | 320 | 310 | 305 | 300 |
| | (6) Particle size distribution | | 0.6 | 0.63 | 0.63 | 0.60 |
| | (7) Amount of aggregate | | 100 | 93 | 120 | 190 |
| Thermoplastic resin composition | (8) Melt flow index | | 17.6 | 17.7 | 18 | 17.3 |
| | (9) Impact strength | | 33.1 | 32.1 | 32.7 | 32.5 |
| | (10) Surface gloss characteristics | | 98 | 98.1 | 99.1 | 98.2 |
| | (11) Gel evaluation | | ⊚ | ⊚ | ⊚ | ⊚ |

TABLE 7

| | | | Comparative Examples | | | |
|---|---|---|---|---|---|---|
| Classification | | | 14 | 15 | 16 | 17 |
| Acrylic coagulant | Monomer mixture | MAA | 3.5 | 3.5 | 4 | 4 |
| | | MA | 96.5 | 96.5 | 96 | 96 |
| | | EA | — | — | — | — |
| | | BA | — | — | — | — |
| | First emulsifier (parts by weight) | | 0.109 | 0.2 | 0.064 | 0.040 |
| | Second emulsifier (parts by weight) | | 0.291 | 0.2 | 0.336 | 0.36 |
| | n of Chemical Formula 1 | | | 1 | | |
| | X of Expression 1 | | | 2.5~3.5 | | |
| | Y of Expression 2 | | about 61.07~64.07 | | 53.25~56.25 | |
| | (1) Average particle diameter | | 64.5 | 74 | 58 | 55 |
| | (2) Weight-average molecular weight | | 740,000 | 711,000 | 699,000 | 687,000 |
| | (3) Polymerization conversion rate | | >99.9 | >99. | >99. | 99.9 |
| | Addition amount of coagulant (parts by weight) | | 0.66 | 0.66 | 0.66 | 0.66 |
| Second diene-based rubber polymer | (4) Aggregation phenomenon | | × | × | ? | ? |
| | (5) Average particle diameter | | 309 | 333 | — | — |
| | (6) Particle size distribution | | 0.60 | 0.63 | — | — |
| | (7) Amount of aggregate | | 890 | 350 | — | — |
| Thermoplastic resin composition | (8) Melt flow index | | 15.7 | 16.6 | — | — |
| | (9) Impact strength | | 26.0 | 20.6 | — | — |
| | (10) Surface gloss characteristics | | 96.3 | 95.1 | — | — |
| | (11) Gel evaluation | | Δ | Δ | — | — |

TABLE 8

| | | | Comparative Examples | | | |
|---|---|---|---|---|---|---|
| Classification | | | 18 | 19 | 20 | 21 |
| Acrylic coagulant | Monomer mixture | MAA | 4 | 4.5 | 5 | 5 |
| | | MA | — | — | — | — |
| | | EA | 96 | 96 | 95 | 95 |
| | | BA | — | — | — | — |
| | First emulsifier (parts by weight) | | 0.336 | 0.34 | 0.297 | 0.31 |
| | Second emulsifier (parts by weight) | | 0.064 | 0.06 | 0.103 | 0.09 |
| | n of Chemical Formula 1 | | 1 | 1 | 1 | 1 |
| | X of Expression 1 | | 5~7 | 5~7 | 5~7 | 5~7 |
| | Y of Expression 2 | | about 141~444 | about 125.17~128.17 | about 112.5~115.5 | about 112.5~115.5 |
| | (1) Average particle diameter | | 143 | 126 | 100 | 112 |
| | (2) Weight-average molecular weight | | 350,000 | 360,000 | 320,000 | 330,000 |
| | (3) Polymerization conversion rate | | >99.9 | 99.8 | 99.9 | >99.9 |
| | Addition amount of coagulant (parts by weight) | | 1.2 | 1.2 | 1.2 | 1.2 |
| Second diene-basedr ubber polymer | (4) Aggregation phenomenon | | × | × | × | × |
| | (5) Average particle diameter | | 191 | 201 | 278 | 311 |
| | (6) Particle size distribution | | 0.61 | 0.62 | 0.51 | 0.66 |
| | (7) Amount of aggregate | | 700 | 1,000 | 1280 | 200 |
| Thermoplastic resin composition | (8) Melt flow index | | 14.8 | 15.0 | 17.2 | 16.4 |
| | (9) Impact strength | | 10.9 | 11.1 | 19.9 | 27.9 |
| | (10) Surface gloss characteristics | | 88.3 | 87.9 | 85.9 | 98.7 |
| | (11) Gel evaluation | | × | × | × | ? |

TABLE 9

|  | Classification |  | Examples 11 | Examples 12 | Examples 13 |
|---|---|---|---|---|---|
| Acrylic copolymer coagulant | Monomer mixture | MAA | 5 | 5 | 5 |
|  |  | MA | — | — | — |
|  |  | EA | 95 | 95 | 95 |
|  |  | BA | — | — | — |
|  | First emulsifier (parts by weight) |  | 0.312 | 0.313 | 0.315 |
|  | Second emulsifier (parts by weight) |  | 0.088 | 0.087 | 0.085 |
|  | n of Chemical Formula 1 |  |  | 1 |  |
|  | X of Expression 1 |  |  | 5~7 |  |
|  | Y of Expression 2 |  |  | about 112.5~115.5 |  |
|  | (1) Average particle diameter |  | 112.5 | 114 | 115.5 |
|  | (2) Weight-average molecular weight |  | 330,000 | 322,000 | 334,000 |
|  | (3) Polymerization conversion rate |  | 99.9 | >99.9 | 99.9 |
|  | Addition amount of coagulant (parts by weight) |  | 1.2 | 1.2 | 1.2 |
| Second diene-based rubber polymer | (4) Aggregation phenomenon |  | × | × | × |
|  | (5) Average particle diameter |  | 299 | 293 | 302 |
|  | (6) Particle size distribution |  | 0.55 | 0.55 | 0.56 |
|  | (7) Amount of aggregate |  | 150 | 120 | 100 |
| Thermoplastic resin composition | (8) Melt flow index |  | 18.1 | 17.9 | 17.9 |
|  | (9) Impact strength |  | 30.2 | 30.4 | 31.1 |
|  | (10) Surface gloss characteristics |  | 98.2 | 98.9 | 99 |
|  | (11) Gel evaluation |  | ⊚ | ⊚ | ⊚ |

TABLE 10

|  | Classification |  | Comparative Examples 22 | Comparative Examples 23 | Comparative Examples 24 | Comparative Examples 25 |
|---|---|---|---|---|---|---|
| Acrylic copolymer coagulant | Monomer mixture | MAA | 5 | 5 | 6 | 6 |
|  |  | MA | — | — | — | — |
|  |  | EA | 95 | 95 | 94 | 94 |
|  |  | BA | — | — | — | — |
|  | First emulsifier (parts by weight) |  | 0.316 | 0.322 | 0.2 | 0.256 |
|  | Second emulsifier (parts by weight) |  | 0.084 | 0.078 | 0.2 | 0.144 |
|  | n of Chemical Formula 1 |  |  | 1 |  |  |
|  | X of Expression 1 |  |  | 5~7 |  |  |
|  | Y of Expression 2 |  | about 112.5~115.5 |  | about 93.5~96.5 |  |
|  | (1) Average particle diameter |  | 116 | 128 | 80 | 92.5 |
|  | (2) Weight-average molecular weight |  | 360,000 | 330,000 | 319,000 | 350,000 |
|  | (3) Polymerization conversion rate |  | >99.9 | 99.8 | 99.9 | 99.9 |
|  | Addition amount of coagulant (parts by weight) |  | 1.2 | 1.2 | 1.2 | 1.2 |
| Second diene-based rubber polymer | (4) Aggregation phenomenon |  | × | × | × | × |
|  | (5) Average particle diameter |  | 300 | 290 | 297 | 300 |
|  | (6) Particle size distribution |  | 0.59 | 0.55 | 0.5 | 0.6 |
|  | (7) Amount of aggregate |  | 120 | 350 | 390 | 400 |
| Thermoplastic resin composition | (8) Melt flow index |  | 19 | 16.6 | 17.3 | 17 |
|  | (9) Impact strength |  | 25 | 21.7 | 22.7 | 24.2 |
|  | (10) Surface gloss characteristics |  | 97 | 90.2 | 91.6 | 96 |
|  | (11) Gel evaluation |  | ⊚ | ⊚ | ⊚ | ⊚ |

TABLE 11

| Classification | | | Examples 14 | Examples 15 | Examples 16 |
|---|---|---|---|---|---|
| Acrylic copolymer coagulant | Monomer mixture | MAA | 6 | 6 | 6 |
| | | MA | — | — | — |
| | | EA | 94 | 94 | 94 |
| | | BA | — | — | — |
| | First emulsifier (parts by weight) | | 0.08 | 0.1 | 0.107 |
| | Second emulsifier (parts by weight) | | 0.32 | 0.3 | 0.293 |
| | n of Chemical Formula 1 | | | 1 | |
| | X of Expression 1 | | | 5~7 | |
| | Y of Expression 2 | | | about 93.5~96.5 | |
| | (1) Average particle diameter | | 93.5 | 95 | 96.5 |
| | (2) Weight-average molecular weight | | 303,000 | 308,000 | 298,000 |
| | (3) Polymerization conversion rate | | >99.9 | 99.8 | 99.9 |
| | Addition amount of coagulant (parts by weight) | | 1.2 | 1.2 | 1.2 |
| Second diene-based rubber polymer | (4) Aggregation phenomenon | | × | × | × |
| | (5) Average particle diameter | | 310 | 314 | 300 |
| | (6) Particle size distribution | | 0.56 | 0.56 | 0.6 |
| | (7) Amount of aggregate | | 100 | 130 | 190 |
| Thermoplastic resin composition | (8) Melt flow index | | 18 | 18.1 | 17.9 |
| | (9) Impact strength | | 31 | 31.3 | 30.2 |
| | (10) Surface gloss characteristics | | 98.1 | 98 | 98 |
| | (11) Gel evaluation | | ? | ? | ? |

TABLE 12

| Classification | | | Comparative Examples 26 | 27 | 28 | 29 |
|---|---|---|---|---|---|---|
| Acrylic copolymer coagulant | Monomer mixture | MAA | 6 | 6 | 7 | 7 |
| | | MA | — | — | — | — |
| | | EA | 94 | 94 | 93 | 93 |
| | | BA | — | — | — | — |
| | First emulsifier (parts by weight) | | 0.303 | 0.306 | 0.19 | 0.283 |
| | Second emulsifier (parts by weight) | | 0.097 | 0.094 | 0.21 | 0.117 |
| | n of Chemical Formula 1 | | | 1 | | |
| | X of Expression 1 | | | 5~7 | | |
| | Y of Expression 2 | | about 93.5~96.5 | | 79.93~82.93 | |
| | (1) Average particle diameter | | 97.5 | 99 | 71 | 79.5 |
| | (2) Weight-average molecular weight | | 360,000 | 317,000 | 289,000 | 300,000 |
| | (3) Polymerization conversion rate | | 99.8 | >99.9 | >99.9 | >99.9 |
| | Addition amount of coagulant (parts by weight) | | 1.2 | 1.2 | 1.2 | 1.2 |
| Second diene-based rubber polymer | (4) Aggregation phenomenon | | × | × | × | × |
| | (5) Average particle diameter | | 300 | 291 | 300 | 335 |
| | (6) Particle size distribution | | 0.62 | 0.59 | 0.45 | 0.44 |
| | (7) Amount of aggregate | | 500 | 420 | 500 | 600 |
| Thermoplastic resin composition | (8) Melt flow index | | 17 | 16.9 | 18.9 | 18 |
| | (9) Impact strength | | 24.9 | 23 | 18.6 | 25.7 |
| | (10) Surface gloss characteristics | | 95.1 | 96.7 | 97.2 | 98 |
| | (11) Gel evaluation | | ? | ? | ? | ? |

TABLE 13

| Classification | | | Examples | |
|---|---|---|---|---|
| | | | 17 | 18 |
| Acrylic copolymer coagulant | Monomer mixture | MAA | 7 | 7 |
| | | MA | — | — |
| | | EA | 93 | 93 |
| | | BA | — | — |
| | First emulsifier (parts by weight) | | 0.312 | 0.313 |
| | Second emulsifier (parts by weight) | | 0.088 | 0.087 |
| | n of Chemical Formula 1 | | 1 | |
| | X of Expression 1 | | 5~7 | |
| | Y of Expression 2 | | 79.93~82.93 | |
| | (1) Average particle diameter | | 80 | 82.5 |
| | (2) Weight-average molecular weight | | 299,000 | 297,000 |
| | (3) Polymerization conversion rate | | >99.9 | 99.8 |
| | Addition amount of coagulant (parts by weight) | | 1.2 | 1.2 |
| Second diene-based rubber polymer | (4) Aggregation phenomenon | | × | × |
| | (5) Average particle diameter | | 314 | 320 |
| | (6) Particle size distribution | | 0.47 | 0.48 |
| | (7) Amount of aggregate | | 100 | 105 |
| Thermoplastic resin composition | (8) Melt flow index | | 18.9 | 18.5 |
| | (9) Impact strength | | 31.2 | 30.9 |
| | (10) Surface gloss characteristics | | 97.9 | 98.1 |
| | (11) Gel evaluation | | ? | ? |

TABLE 14

| Classification | | | Comparative Examples | | |
|---|---|---|---|---|---|
| | | | 30 | 31 | 32 |
| Acrylic coagulant | Monomer mixture | MAA | 7 | 7 | 7.5 |
| | | MA | — | — | — |
| | | EA | 93 | 93 | 92.5 |
| | | BA | — | — | — |
| | First emulsifier (parts by weight) | | 0.289 | 0.31 | 0.313 |
| | Second emulsifier (parts by weight) | | 0.111 | 0.09 | 0.087 |
| | n of Chemical Formula 1 | | 1 | | |
| | X of Expression 1 | | 5~7 | | |
| | Y of Expression 2 | | 79.93~82.93 | | about 74.5~77.5 |
| | (1) Average particle diameter | | 83.5 | 95 | 76 |
| | (2) Weight-average molecular weight | | 310,000 | 292,000 | 300,000 |
| | (3) Polymerization conversion rate | | 99.8 | 99.9 | 99.9 |
| | Addition amoun of coagulant (parts by weight) | | 1.2 | 1.2 | 1.2 |
| Second diene-based rubber polymer | (4) Aggregation phenomenon | | × | × | ? |
| | (5) Average particle diameter | | 348 | 351 | — |
| | (6) Particle size distribution | | 0.46 | 0.6 | — |
| | (7) Amount of aggregate | | 800 | 270 | — |
| Thermoplastic resin composition | (8) Melt flow index | | 17.2 | 18.1 | — |
| | (9) Impact strength | | 26 | 21.9 | — |
| | (10) Surface gloss characteristics | | 98 | 99 | — |
| | (11) Gel evaluation | | ? | ? | — |

TABLE 15

| Classification | | | Comparative Examples | | | | | |
|---|---|---|---|---|---|---|---|---|
| | | | 33 | 34 | 35 | 36 | 37 | 38 |
| Acrylic copolymer coagulant | Monomer mixture | MAA | 16 | 16 | 16 | 18 | 18 | 18 |
| | | MA | — | — | — | — | — | — |
| | | EA | — | — | — | — | — | — |
| | | BA | 84 | 84 | 84 | 82 | 82 | 82 |
| | First emulsifier (parts by weight) | | 0.363 | 0.34 | 0.385 | 0.3 | 0.349 | 0.367 |
| | Second emulsifier (parts by weight) | | 0.037 | 0.06 | 0.018 | 0.1 | 0.051 | 0.033 |
| | n of Chemical Formula 1 | | 3 | | | | | |
| | X of Expression 1 | | 16~18 | | | | | |
| | Y of Expression 2 | | about 156.07~159.07 | | | about 138.56~141.56 | | |
| | (1) Average particle diameter | | 157 | 131 | 180 | 110 | 140 | 160 |
| | (2) Weight-average molecular weight | | 500,000 | 466,000 | 455,000 | 440,000 | 453,000 | 453,000 |
| | (3) Polymerization conversion rate | | >99.9 | 99.8 | 99.9 | 99.9 | >99.9 | 99.8 |
| | Addition amount of coagulant (parts by weight) | | 1.2 | 1.2 | 1.2 | 1.2 | 1.2 | 1.2 |
| Second diene-based rubber polymer | (4) Aggregation phenomenon | | × | ○ | × | × | × | × |
| | (5) Average particle diameter | | 306 | — | 344 | 321 | 331 | 348 |
| | (6) Particle size distribution | | 0.66 | — | 0.68 | 0.59 | 0.64 | 0.7 |
| | (7) Amount of aggregate | | 500 | — | 200 | 180 | 110 | 175 |

TABLE 15-continued

|  | Classification | Comparative Examples | | | | | |
|---|---|---|---|---|---|---|---|
|  |  | 33 | 34 | 35 | 36 | 37 | 38 |
| Thermo-plastic resin composition | (8) Melt flow index | 17.4 | — | 17 | 16.9 | 17.6 | 15.9 |
|  | (9) Impact strength | 29 | — | 18.8 | 20.2 | 31.3 | 18.5 |
|  | (10) Surface gloss characteristics | 90 | — | 92 | 90 | 84 | 84 |
|  | (11) Gel evaluation | Δ | — | × | × | Δ | × |

TABLE 16

|  |  |  | Comparative Examples | | |
|---|---|---|---|---|---|
|  | Classification |  | 39 | 40 | 41 |
| Acrylic copolymer coagulant | Monomer mixture | MAA | 20 | 20 | 20 |
|  |  | MA | — | — | — |
|  |  | EA | — | — | — |
|  |  | BA | 80 | 80 | 80 |
|  | First emulsifier (parts by weight) |  | 0.3 | 0.342 | 0.358 |
|  | Second emulsifier (parts by weight) |  | 0.1 | 0.058 | 0.042 |
|  | n of Chemical Formula 1 |  |  | 3 |  |
|  | X of Expression 1 |  |  | 16~18 |  |
|  | Y of Expression 2 |  |  | about 124.55~127.55 |  |
|  | (1) Average particle diameter |  | 100 | 126 | 147 |
|  | (2) Weight-average molecular weight |  | 411,000 | 408,000 | 427,000 |
|  | (3) Polymerization conversion rate |  | 99.9 | 99.8 | 99.9 |
|  | Addition amount of coagulant (parts by weight) |  | 1.2 | 1.2 | 1.2 |
| Second diene-based rubber polymer | (4) Aggregation phenomenon |  | × | × | ? |
|  | (5) Average particle diameter |  | 330 | 330 | — |
|  | (6) Particle size distribution |  | 0.57 | 0.65 | — |
|  | (7) Amount of aggregate |  | 400 | 102 | — |
| Thermoplastic resin composition | (8) Melt flow index |  | 16 | 17.2 | — |
|  | (9) Impact strength |  | 15.9 | 29.4 | — |
|  | (10) Surface gloss characteristics |  | 88 | 84 | — |
|  | (11) Gel evaluation |  | × | Δ | — |

Referring to Table, it can be seen that Examples 1 to 10 exhibited a small amount of aggregates compared to Comparative Examples 1 to 17 and thus were excellent in latex stability, a melt flow index, impact strength, and surface gloss characteristics. It can be seen that Comparative Examples 1 and 2, in which the X value was below the range of Expression 1, exhibited degraded latex stability due to a large amount of aggregates and degraded processability due to a low melt flow index, and the impact strength and surface gloss characteristics thereof were also degraded. In addition, it can be seen that Comparative Example 2, in which the addition amount of a coagulant increased compared to Comparative Example 1, exhibited an improved melt flow index and improved impact strength, but surface gloss characteristics were degraded, and many gels were generated, leading to degraded appearance characteristics.

It can be seen that Comparative Examples 3 to 15, which did not satisfy Expression 2, exhibited degraded latex stability due to a large amount of aggregates and degraded processability due to a low melt flow index, and the impact strength and surface gloss characteristics thereof were also degraded.

In the case of Comparative Examples 16 and 17 in which the X value was above the range of Expression 1, an aggregation phenomenon occurred, and thus it was not possible to prepare a second diene-based rubber polymer.

It can be seen that Examples 11 to 16 exhibited a small amount of aggregates compared to Comparative Examples 18 to 32 and thus were excellent in latex stability, a melt flow index, impact strength, and surface gloss characteristics.

It can be seen that Comparative Examples 18 and 19, in which the X value was below the range of Expression 1, exhibited degraded latex stability due to a large amount of aggregates and degraded processability due to a low melt flow index, and the impact strength and surface gloss characteristics thereof were also degraded. In addition, it can be seen that Comparative Example 2, in which the addition amount of a coagulant increased compared to Comparative Example 1, exhibited an improved melt flow index and improved impact strength, but surface gloss characteristics were degraded, and many gels were generated, leading to degraded appearance characteristics.

It can be seen that Comparative Examples 20 to 31, which did not satisfy Expression 2, exhibited degraded latex stability due to a large amount of aggregates and degraded processability due to a low melt flow index, and the impact strength and surface gloss characteristics thereof were also degraded.

In the case of Comparative Example 32 in which Chemical Formula 1 and Expression 2 were satisfied, and the X value was above the range of Expression 1, an aggregation phenomenon occurred, and thus it was not possible to prepare a second diene-based rubber polymer.

It can be seen that Comparative Examples 33 and 37, which did not satisfy Chemical Formula 1, exhibited degraded latex stability due to a large amount of aggregates and degraded processability due to a low melt flow index, and the impact strength and surface gloss characteristics thereof were also degraded In the case of Comparative Example 34 in which Chemical Formula 1 was not satisfied, Expression 1 was satisfied, and the Y value was below the range of Expression 2, an aggregation phenomenon occurred, and thus it was not possible to prepare a second diene-based rubber polymer.

It can be seen that Comparative Examples 35 and 38, in which Chemical Formula 1 was not satisfied, Expression 1 was satisfied, and the Y value was above the range of Expression 2, exhibited degraded latex stability due to a large amount of aggregates and degraded processability due to a low melt flow index, and the impact strength and surface gloss characteristics thereof were also degraded, and an excessive amount of large-sized gels were generated, leading to poor appearance characteristics.

It can be seen that Comparative Example 36, in which Chemical Formula 1 was not satisfied, Expression 1 was satisfied, and the Y value was below the range of Expression 2, exhibited degraded latex stability due to a large amount of aggregates and degraded processability due to a low melt flow index, and the impact strength and surface gloss characteristics thereof were also degraded, and an excessive amount of large-sized gels were generated, leading to poor appearance characteristics.

It can be seen that Comparative Example 39, in which Chemical Formula 1 and Expression 1 were not satisfied, and the Y value was below the range of Expression 2, exhibited degraded latex stability due to a large amount of aggregates and degraded processability due to a low melt flow index, and the impact strength and surface gloss characteristics thereof were also degraded, and an excessive amount of large-sized gels were generated, leading to poor appearance characteristics.

It can be seen that Comparative Example 40, which did not satisfy Chemical Formula 1 and Expression 1 and satisfied Expression 2, exhibited degraded latex stability due to a large amount of aggregates and degraded processability due to a low melt flow index, and the impact strength and surface gloss characteristics thereof were also degraded, and an excessive amount of large-sized gels were generated, leading to poor appearance characteristics.

In the case of Comparative Example 41 in which Chemical Formula 1 and Expression 1 were not satisfied, and the Y value was above the range of Expression 2, an aggregation phenomenon occurred, and thus it was not possible to prepare a second diene-based rubber polymer.

The invention claimed is:

1. An acrylic copolymer coagulant which is a copolymer of a monomer mixture comprising a carboxylic acid-based monomer and an acrylic monomer represented by Chemical Formula 1 below,
wherein a content X of a carboxylic acid-based monomer unit in the acrylic copolymer coagulant satisfies Expression 1 below, and
an average particle diameter Y of the acrylic copolymer coagulant satisfies Expression 2 below,
wherein the acrylic copolymer coagulant has a weight-average molecular weight of 700,000 g/mol to 950,000 g/mol:

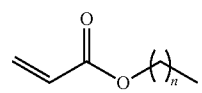  <Chemical Formula 1> in Chemical Formula 1,
n is 0, $$2+(n+1)^2-0.5(n+1) \leq X \leq 2+(n+1)^2+0.5(n+1) \quad \text{<Expression 1>}$$

$$\{20.817 \times (n+1)^2 - 27.35 \times (n+1) + 28.433\}/X \times 10 - 1.5 \leq Y \leq \{20.817 \times (n+1)^2 - 27.35 \times (n+1) + 28.433\}/X \times 10 + 1.5 \quad \text{<Expression 2>}$$

in Expressions 1 and 2,
n is an n value of Chemical Formula 1,
X is a content of a carboxylic acid-based monomer unit comprised in the acrylic copolymer coagulant (units: wt %), and
Y is an average particle diameter of the acrylic copolymer coagulant (units: nm).

2. The acrylic copolymer coagulant of claim 1, wherein an average particle diameter Y of the acrylic copolymer coagulant is in a range of 61.5 nm to 89.1 nm.

3. An acrylic copolymer coagulant which is a copolymer of a monomer mixture comprising a carboxylic acid-based monomer and an acrylic monomer represented by Chemical Formula 1 below,
wherein a content X of a carboxylic acid-based monomer unit in the acrylic copolymer coagulant satisfies Expression 1 below, and
an average particle diameter Y of the acrylic copolymer coagulant satisfies Expression 2 below,
wherein the acrylic copolymer coagulant has a weight-average molecular weight of 250,000 g/mol to 350,000 g/mol:

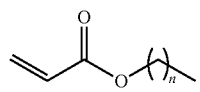  <Chemical Formula 1> in Chemical Formula 1,
n is 1, $$2+(n+1)2-0.5(n+1) \leq X \leq 2+(n+1)2+0.5(n+1) \quad \text{<Expression 1>}$$

$$\{20.817 \times (n+1)2 - 27.35 \times (n+1) + 28.433\}/X \times 10 - 1.5 \leq Y \leq \{20.817 \times (n+1)2 - 27.35 \times (n+1) + 28.433\}/X \times 10 + 1.5 \quad \text{<Expression 2>}$$

in Expressions 1 and 2,
n is an n value of Chemical Formula 1,
X is a content of a carboxylic acid-based monomer unit comprised in the acrylic copolymer coagulant (units: wt %), and
Y is an average particle diameter of the acrylic copolymer coagulant (units: nm).

4. The acrylic copolymer coagulant of claim 3, wherein an average particle diameter Y of the acrylic copolymer coagulant is in a range of 80 nm to 115.5 nm.

5. A method of preparing a graft copolymer, comprising:
preparing a second diene-based rubber polymer by coagulation of a first diene-based rubber polymer with the acrylic copolymer coagulant according to claim 1; and
preparing a graft copolymer by graft polymerization of the second diene-based rubber polymer with an aromatic vinyl-based monomer and a vinyl cyanide-based monomer.

6. The method of claim 5, wherein the first diene-based rubber polymer has an average particle diameter of 90 to 110 nm, and the second diene-based rubber polymer has an average particle diameter of 250 to 350 nm.

* * * * *